(12) United States Patent
Ko et al.

(10) Patent No.: US 12,505,216 B2
(45) Date of Patent: Dec. 23, 2025

(54) DETECTING APPARATUS OF AVOID TYPE MALICIOUS CODE FOR VIRTUALIZATION SYSTEM BASED ON ARTIFICIAL INTELLIGENCE USING INTEGRATED FEATURES

(71) Applicant: SECURELINK CO., LTD, Seoul (KR)

(72) Inventors: Jun Yong Ko, Gyeonggi-do (KR); Ju Sun Park, Seoul (KR)

(73) Assignee: SECURELINK CO., LTD, Seoul (KR)

( * ) Notice: Subject to any disclaimer, the term of this patent is extended or adjusted under 35 U.S.C. 154(b) by 89 days.

(21) Appl. No.: 18/660,250

(22) Filed: May 10, 2024

(65) Prior Publication Data

US 2024/0289461 A1     Aug. 29, 2024

Related U.S. Application Data

(63) Continuation of application No. PCT/KR2021/016631, filed on Nov. 15, 2021.

(30) Foreign Application Priority Data

Nov. 12, 2021    (KR) ........................ 10-2021-0155602

(51) Int. Cl.
     *G06F 21/56*        (2013.01)

(52) U.S. Cl.
     CPC ...... *G06F 21/566* (2013.01); *G06F 2221/034* (2013.01)

(58) Field of Classification Search
     CPC ......... G06F 21/566; G06F 21/53; G06F 21/56
See application file for complete search history.

(56) References Cited

U.S. PATENT DOCUMENTS

| | | | | |
|---|---|---|---|---|
| 8,713,631 | B1* | 4/2014 | Pavlyushchik | G06F 21/566 |
| | | | | 726/1 |
| 9,223,962 | B1* | 12/2015 | Kashyap | G06F 21/52 |
| 2013/0347131 | A1* | 12/2013 | Mooring | G06F 21/566 |
| | | | | 726/29 |
| 2024/0289461 | A1* | 8/2024 | Ko | G06F 21/56 |

OTHER PUBLICATIONS

Alan Mills and Phil Legg, Investigating Anti-Evasion Malware Triggers Using Automated Sandbox Reconfiguration Techniques, 21 pages, Nov. 20, 2020.
WIPO, International Search Report issued for International Patent Application No. PCT/KR2021/016631, 3 pages, Jul. 28, 2022.

* cited by examiner

*Primary Examiner* — Ponnoreay Pich
(74) *Attorney, Agent, or Firm* — Nicholas Park

(57) ABSTRACT

A computing device for determining a malicious code, comprising: a virtual information configured to generate a virtualization profile for a virtual machine to execute a target code detected using a terminal configuration information received from a target terminal; a determiner configured to preprocess at least one dynamic characteristic related to an avoid command for a virtualization system contained within the target code transmitted from the virtual machine of the target terminal, select at least one artificial neural network from a plurality of pre-trained artificial neural networks based on a characteristic value of the preprocessed at least one dynamic characteristic, and determine whether the target code is a malicious code using the selected artificial neural network.

9 Claims, 4 Drawing Sheets

DETECTING APPARATUS OF AVOID TYPE MALICIOUS CODE FOR VIRTUALIZATION SYSTEM BASED ON ARTIFICIAL INTELLIGENCE USING INTEGRATED FEATURES

CROSS-REFERENCE TO RELATED APPLICATION

This application is a US Bypass Continuation Application of International Application No. PCT/KR2021/016631, filed on Nov. 15, 2021, which claims priority to and the benefit of Korean Patent Application No. 10-2021-0155602, filed on Nov. 12, 2021, the disclosure of which is incorporated herein by reference in its entirety.

BACKGROUND

Technical Field

The present disclosure relates to an AI-based malicious code detection device. More specifically, this concerns a malicious code detection device capable of effectively detecting and blocking malicious code by responding to technologies that do not operate in virtualization systems, such as variant engines, packing, and sandboxes used in malicious code for the purpose of avoiding various detection technologies.

Related Art

The combination of ransomware and advanced persistent threat (APT) advanced hacking technologies has led to an exponential increase in ransomware-related damage in countries around the world, with the service of large U.S. oil supply chain companies suspended in 2020, and in Korea, the central system of a famous department store was shut down due to a ransomware attack, causing inconvenience to customers who shop on the weekend and increasing damage to many cooperative small and medium-sized businesses.

In 2021, important information from major public enterprises in Korea was stolen or damaged by ransomware attacks. Accordingly, the Korean government announced a comprehensive plan for joint ransomware between the public and private sectors in October 2021, and the United States also announced a plan to respond to hacking attacks such as ransomware in 2021 by considering it as a terrorist attack on the US mainland.

In this background, new malicious codes such as ransomware, which are more powerful than any other virus, are characterized by the largest rate of generation of new variants of malicious code, ranging from thousands to tens of thousands of types a day, and are becoming difficult to respond to.

Therefore, it is no longer possible to respond simply as a signature-based blacklist, and many domestic and foreign vaccine companies are also applying artificial intelligence-connected malicious code and ransomware detection technology, and companies with new professional malicious code detection technology are emerging.

However, even if these artificial intelligence-based technologies are applied, new malicious code and ransomware are being created through engines that pack or transform the generated malicious code itself, such as polymorphic variants, into completely different codes. Since the detection rate for the generated malicious code remains at most about the early to mid-90% level, new detection technologies are constantly needed in that even a single malicious code and ransomware can have fatal consequences for the organization.

An artificial intelligence-based automatic virtual machine implementation technology is needed to automatically configure a virtualization profile that is most similar to the terminal's actual environment, extract static and dynamic characteristics of malicious code within a short period of time, learn these characteristics, and block them in advance.

SUMMARY

Technical Solution

According to one embodiment, a computing device for determining a malicious code based on artificial intelligence, comprising: at least one processor; a virtual information collector implemented by the at least one processor, configured to generate a virtualization profile for a virtual machine to execute a target code detected using a terminal configuration information received from a target terminal; a determiner implemented by the at least one processor, configured to preprocess at least one dynamic characteristic related to an avoid command for a virtualization system contained within the target code transmitted from the virtual machine of the target terminal, select at least one artificial neural network from a plurality of pre-trained artificial neural networks pre-trained based on a characteristic value of the preprocessed at least one dynamic characteristic, and determine whether the target code is a malicious code using the selected artificial neural network, wherein the determiner determines candidates of the artificial neural network based on whether the characteristic value of the preprocessed dynamic characteristic is a continuous data, comprises a text data, or comprises a binary data, and selects the at least one artificial neural network based on a numerical range of the continuous data if the characteristic value is a continuous data.

According to one embodiment, the computing device, further comprising: a log manager configured to store and manage a log data for termination and isolation of a process for the malicious code according to a determination result by the determiner; wherein the determiner preprocesses the at least one dynamic characteristic extracted from the virtual machine, by sampling at least one of a counting data for data movement in a section where the target code is executed for a predetermined time, an access counting data in a network area, a maximum allocated memory data in a memory area, and an input and output counting data in a central processing area.

According to one embodiment, the determiner determines the candidates of artificial neural network based on whether the characteristic value of the preprocessed dynamic characteristic match an input data used in a training process of the plurality of pre-trained artificial neural networks, and an output data of the plurality of pre-trained artificial neural networks represents a probability value as to whether the target code is a malicious code.

According to one embodiment, if the characteristic value of the preprocessed dynamic characteristic do not match the input data used in the training process of the plurality of pre-trained artificial neural networks, the determiner extracts an additional static characteristic of the target code and determines the candidates of artificial neural network based on the extracted additional static characteristic, wherein the extracted additional static characteristic includes at least one of an execution code of the target code, a structural information of an execution file, and a binary data composing the execution file.

According to one embodiment, if the characteristic value of the preprocessed dynamic characteristic is a discrete data, the determiner inputs the preprocessed dynamic characteristic into each of the determined candidates of artificial neural network and determines whether the target code is malicious code using a maximum value and an average value of the probability value output from each of the determined candidates of artificial neural network.

According to another embodiment, a terminal for determining a malicious code using an artificial neural network within a designated server, comprising: at least one processor; a configuration information collector implemented by the at least one processor, configured to collect a configuration information of the terminal, including a hardware information, an operating system information, and a software information of the terminal, to receive a virtualization profile from the designated server and send the configuration information to the designated server; a detector implemented by the at least one processor, configured to, if an undefined process associated with an avoid command against a virtualization system is executed, stop the undefined process and send a target code associated with the undefined process to the designated server; and a virtual machine executor implemented by the at least one processor, configured to execute the undefined process for a predetermined period based on the virtualization profile sent by the designated server and send at least one of a static characteristic and dynamic characteristic extracted by the execution to the designated server.

According to one embodiment, the virtual machine executor extracts at least one of a counting data for data movement in a section where the target code is executed for a predetermined time, an access counting data in a network area, a maximum allocated memory data in a memory area, and an input and output counting data in a central processing area as the dynamic characteristic.

According to one embodiment, the virtual machine executor extracts at least one of an execution code of the target code, a structural information of the execution file, and a binary data composing the execution file as the static characteristic.

According to one embodiment, the designated server comprises: a virtual information collector configured to generate a virtualization profile for a virtual machine to execute a target code detected by using a terminal configuration information received from the terminal; and a determiner configured to preprocess at least one dynamic characteristic transmitted from the virtual machine executor of the terminal, select at least one artificial neural network from a plurality of pre-trained artificial neural networks pre-trained based on a characteristic value of the preprocessed dynamic characteristic, and determine whether the target code is a malicious code using the selected artificial neural network; wherein the determiner configured to determine candidates of artificial neural network based on whether the characteristic values of the preprocessed dynamic characteristic is a continuous data, comprises a text data, or comprises a binary data, and select at least one artificial neural network based on a numerical range of the continuous data if the characteristic value is a continuous data.

BRIEF DESCRIPTION OF THE DRAWINGS

The drawings attached for the description of embodiments of this invention are only some examples among the embodiments of the invention, and other drawings can be obtained based on these drawings without additional effort by a person having ordinary skill in the art (hereinafter referred to as "ordinary artisan").

DETAILED DESCRIPTION

Figure 1:
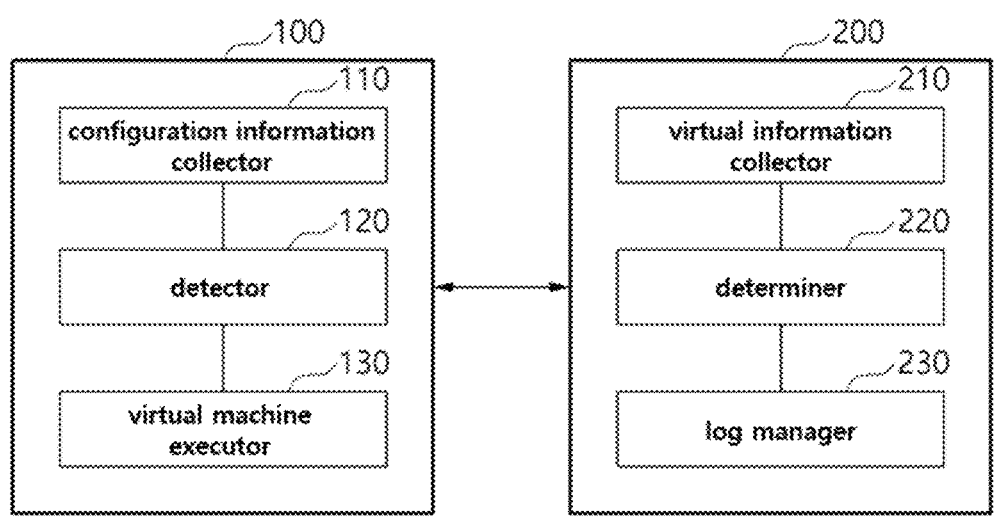
FIG. 1 is a block diagram of a system for determining the presence of malicious code based on artificial intelligence according to an embodiment.

The detailed description of embodiments of the present invention that will be discussed below refers to the accompanying drawings that illustrate specific embodiments in which the invention may be practiced, to clarify the objectives, technical solutions, and advantages of the invention. These embodiments are described in detail to enable a person having ordinary skill in the art to implement the invention.

Throughout the detailed description and the claims of this invention, the terms 'comprising,' and their derivatives, are not intended to exclude other technical features, additives, components, or steps. Moreover, the terms 'one' or 'a' are intended to include one or more items, and the term 'another' is limited to at least a second or more.

Terms such as 'first', 'second', etc., used in the description of the present invention, are used to distinguish one component from another, and are not intended to limit the scope of rights by these terms unless the context indicates a sequential order. For example, a first component could be named a second component, and similarly, a second component could also be named a first component.

When it is mentioned that one component is "connected" to another component, it should be understood that the other component may be directly connected or may involve an intermediary component. Conversely, when it is mentioned that one component is "directly connected" to another, it should be understood that there are no intermediate components present. Other expressions describing the relationship between components, such as "between" and "directly between," or "adjacent to" and "directly adjacent to," should be interpreted similarly.

Reference numerals (such as a, b, c, etc.) used in the description of the steps are for convenience of description only and do not necessarily dictate the order of the steps unless logically required; the steps can occur in a different order than stated, can occur substantially simultaneously, or can occur in the reverse order.

It is expected that other objectives, advantages, and characteristics of the present invention will become apparent to ordinary artisans from this specification and the practice of the invention. The examples and drawings provided below are for illustrative purposes and are not intended to limit the invention. Therefore, the details disclosed in this specification regarding specific structures or functions should not be interpreted as limiting but should be regarded as representative baseline information to guide those skilled in the art to variously practice the invention in substantially equivalent structures.

Moreover, the invention encompasses all possible combinations of the exemplary embodiments described in this specification. Various embodiments of the invention can be different yet are not necessarily mutually exclusive; for example, specific shapes, structures, and characteristics described here in relation to one embodiment can be implemented in other embodiments without departing from the spirit and scope of the invention. Additionally, the positions or arrangements of individual components within each disclosed embodiment can be varied without departing from the spirit and scope of the invention. Thus, the detailed descriptions that follow are not intended to be taken in a limiting sense, and the scope of the present invention is defined only by the appended claims, along with the full range of equivalents to which such claims are entitled. Similar reference numerals across various aspects indicate the same or similar functions.

Unless otherwise indicated in this specification or clearly contradictory in context, items referred to in the singular are intended to include the plural unless contextually demanded otherwise. Furthermore, in describing the invention, if a specific description of a known configuration or function is deemed to blur the gist of the invention, such detailed descriptions are omitted.

Hereinafter, with reference to the accompanying drawings, a detailed explanation will be given regarding preferred embodiments of the invention, to enable an ordinary artisan to easily implement the invention.

FIG. 1 is a block diagram of a system for determining the presence of malicious code based on artificial intelligence according to an embodiment. Referring to FIG. 1, a system for determining the presence of malicious code based on artificial intelligence may comprise a terminal (100) and a server (200). The terminal (100) according to an embodiment may comprise a configuration information collector (110), a detector (120), and a virtual machine executor (130). The configuration information collector (110) collects configuration information of the terminal (100) to receive a virtualization profile from the server (200) and transmits the collected configuration information to the virtual information collector (210) of the server (200). As an example, the configuration information may comprise hardware information, operating system information, and software information of the terminal.

When a non-predefined process is executed, the detector (120) can stop running the process and send the target code associated with the process to the designated server. Specifically, the detector (120) can detect in real-time whether a particular new process entering and running on the terminal (100) corresponds to malicious code based on network communication with the server (200).

Specifically, the detector (120) can receive a virtualization profile transmitted from the server and execute a virtual machine through the virtual machine executor (130). Moreover, the detector (120) can inject and execute target code within the virtual machine, transmitting integrated characteristics (comprising static characteristics and dynamic characteristics) extracted during the execution process to the determiner (220) of the server and receive the results of the judgment.

The virtual machine executor (130) can run a specific process suspected of being malicious code for a predetermined period based on the virtualization profile transmitted by the server (200) and can transmit at least one of the extracted static and dynamic characteristics to the server (200). The virtual machine executor (130) can extract dynamic characteristics according to the execution commands performed by the malicious code to evade the virtualization system.

The server (200) according to an embodiment can comprise a virtual information collector (210), a determiner (220), and a log manager (230). The virtual information collector (210) can create a virtualization profile for a virtual machine to run detected target code using terminal configuration information received from the terminal (100).

The determiner (220) can preprocess at least one dynamic characteristic related to the target code transmitted from the detector (120) of the terminal (100) running the virtual machine. More specifically, the dynamic characteristics can be associated with malicious codeavoid commands of the malicious code against the virtualization system implemented by the terminal (100). Typical dynamic characteristics of malicious code are associated with the malicious code's attack activities themselves so characteristics about execution that access properties such as major file system and network access, registry changes, operating system command execution, and system API calls may be extracted. However, if commands to evade the virtualization system are executed, none of these characteristics are performed, which presents a limitation in that traditional detection systems cannot identify the malicious code. Therefore, the characteristics described in FIG. 3 at the initial execution stage, including memory, threads, CPU, and disk, and network, are characteristics that are often ignored and not processed within existing detection technologies but allow the characteristics of malicious code to be determined through a combination of preprocessing and artificial intelligence models optimized according to the virtualization system configuration requirements.

Moreover, the determiner (220) can select at least one artificial neural network from among multiple pre-trained artificial neural networks based on the characteristic values of the preprocessed dynamic characteristics and use the selected artificial neural network to determine whether the target code is malicious code. Exemplarily, but not limited to, the determiner (220) can determine the candidates of artificial neural networks based on whether the characteristic values of the preprocessed dynamic characteristics are continuous data, comprise text data, or comprise binary data.

Moreover, the determiner (220) can select at least one artificial neural network based on the numerical range of the continuous data if the characteristic values of the preprocessed dynamic characteristics are continuous data. The determiner (200) can determine whether the target code is malicious code through multiple multi-trained artificial intelligence models based on the static and dynamic characteristics.

The determiner (220) can determine the candidates of artificial neural networks based on whether the characteristic values of the preprocessed dynamic characteristics match the input data used in the training process of the pre-trained multiple artificial neural networks. The output data of the multiple artificial neural networks may be probability values indicating whether the target code is malicious code.

Moreover, the determiner (220) can further extract static characteristics of the target code and determine the candidates of artificial neural networks based on the extracted static characteristics if the characteristic values of the preprocessed dynamic characteristics do not match the input data used in the training process of the pre-trained multiple artificial neural networks. Exemplarily, the static characteristics of the target code can comprise at least one of the execution code of the target code, structural information of the executionexecution file, and binary data composing the execution file.

Moreover, the determiner (220) can input the preprocessed dynamic characteristics into each artificial neural network included in the determined candidates of artificial neural networks if the characteristic values of the preprocessed dynamic characteristics are discrete data, and can determine whether the target code is malicious code using the probability values output from each artificial neural network.

The log manager (230) can save and manage log data regarding the termination and isolation of processes related to malicious code according to the determining results of the determiner (220). The log manager (230) can receive and manage type information of malicious code finally processed within the terminal (100).

Figure 2:
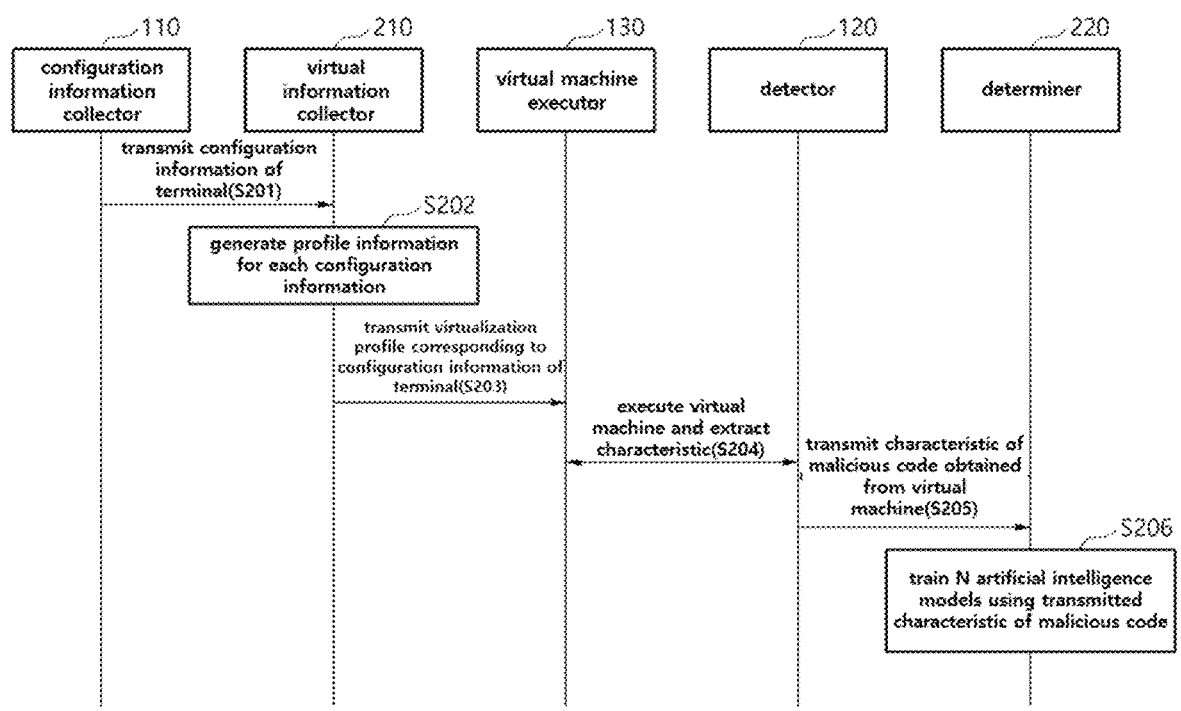
FIG. 2 is a flowchart describing the process of training an artificial neural network using integrated characteristics of malicious code according to an embodiment.

FIG. 2 is a flowchart describing the process of training an artificial neural network using the integrated characteristics of malicious code according to an embodiment. Referring to FIG. 2, at step (S201), the configuration information collector (110) of the terminal can transmit the collected configuration information of the terminal to the virtual information collector (210) of the server. For example, the configuration information of the terminal may include hardware information, operating system information, and software information of the terminal. Although only one configuration information collector (110) is shown in FIG. 2, the virtual information collector (210) can collect configuration information from multiple terminals with different configurations.

At step (S202), the virtual information collector (210) can generate virtualization profile information for each set of collected configuration information. The virtual information collector (210) can create multiple virtualization profiles based on various environmental information transmitted from multiple terminals.

At step (S203), the virtual information collector (210) of the server can transmit a virtualization profile that matches or is highly similar to the terminal's configuration information to the virtual machine executor (130) of the terminal.

At step (S204), the detector (120) can use the received virtualization profile to run target code through the virtual machine executor (130) and recognize a process that includes a avoid command against the virtualization system contained in the target code.

Furthermore, at step (S205), the detector (120) can transmit the static and dynamic characteristics extracted based on the execution results of the target code in the virtual machine executor (130) to the determiner (220) of the server. As another embodiment, it is also feasible to directly send the integrated characteristics extracted by the virtual machine executor (130) to the determiner (220) as per the choice of the ordinary artisan.

At step (S206), the determiner (220) can train N (where N is an arbitrary natural number) artificial intelligence models using the transmitted malicious code characteristics. Specifically, the determiner (220) can determine the artificial intelligence training model based on a combination of the preprocessed results of the extracted dynamic characteristics from predefined artificial intelligence training models. Exemplarily, but not limited to, the determiner (220) can use the static and dynamic characteristics extracted from the execution of malicious code as input data and label information about the malicious code to generate training data for supervised learning of the artificial intelligence model. However, it is also possible that the determiner (220) could implement examples where the artificial intelligence model is trained using unsupervised learning or semi-supervised learning.

Corresponding to the above-described steps, at step (S206), the determiner (220) can also calculate the probability value of whether the target code corresponds to malicious code through N artificial intelligence models using the characteristics of the actual transmitted target code, not only when labeled data about malicious code is transmitted. Further details about the process by which the determiner (220) determines malicious code will be described with additional drawings to follow.

Here, an artificial intelligence model (e.g., neural network) consists of one or more network functions, where one or more network functions can be composed of a collection of interconnected computing units commonly referred to as 'nodes'. These 'nodes' can also be referred to as 'neurons'. One or more network functions include at least one or more nodes. The nodes (or neurons) that make up one or more network functions can be interconnected by one or more 'links'.

Within an artificial intelligence model, one or more nodes connected through links can form a relationship between input nodes and output nodes. The concept of input and output nodes is relative, where any node in relation to an output node could be an input node in relation to another node, and vice versa. As mentioned, the relationship between input nodes and output nodes can be formed around a link. One input node can be connected to one or more output nodes through a link, and vice versa.

In the relationship between the connected input node and output node through a link, the output node can be determined based on the data input to the input node. Here, the node interconnecting the input and output nodes may have a weight. The weight can be variable and can be changed by the user or algorithm to perform the desired function of the artificial intelligence model. For example, if one output node is interconnected with one or more input nodes by respective links, the output node can determine its output value based on the values inputted to the connected input nodes and the weights set on the links corresponding to each input node.

As an embodiment, the determiner (220) can sequentially configure artificial intelligence models. The artificial intelligence learning models configured by the determiner (220) can consist of multiple models, and the candidate artificial neural networks to be used for detection in the subsequent malicious code detection process can be determined based on the combination of integrated characteristics used in the learning models. Although not shown in FIG. 2, the artificial intelligence learning models generated by the determiner (220) could be propagated and shared to other servers or detectors within terminals connected to different clouds.

Figure 3:
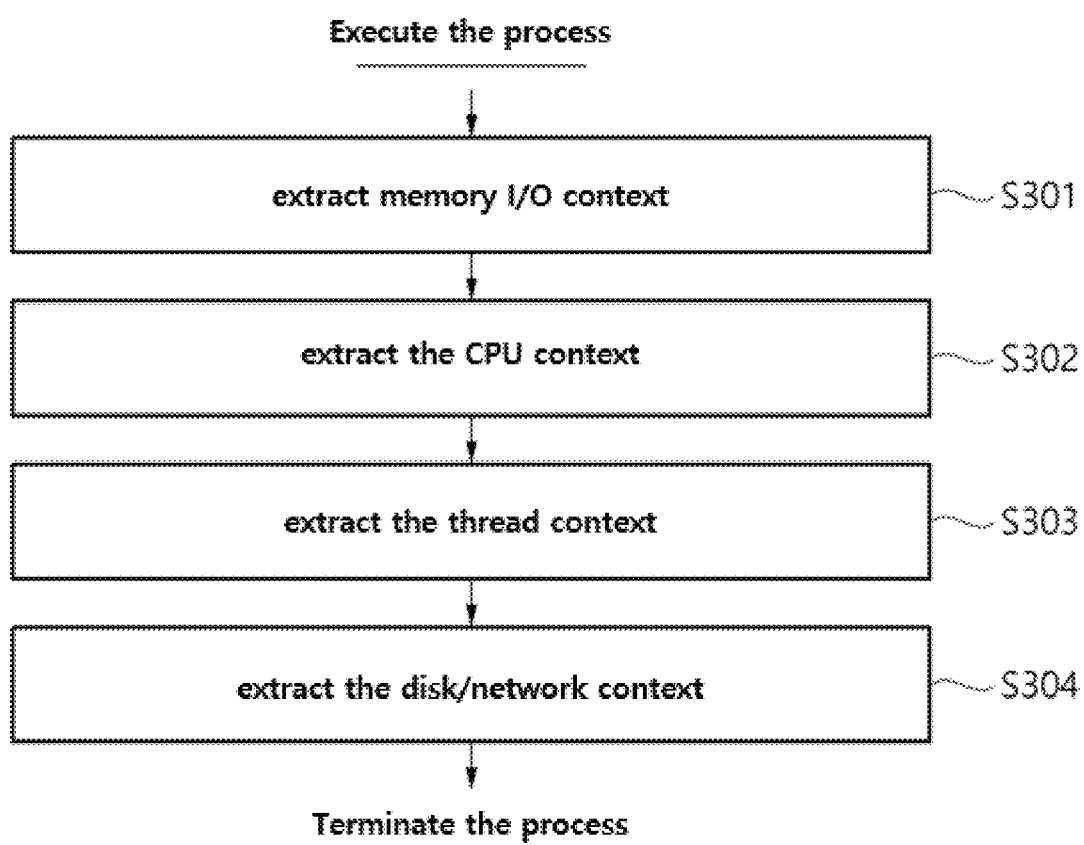
FIG. 3 is a flowchart describing the process of extracting characteristics from malicious code by the virtual machine execution part of a terminal according to an embodiment.

FIG. 3 is a flowchart describing the process by which a virtual machine executor of a terminal extracts characteristics from malicious code. According to this embodiment, the virtual machine executor can extract static and dynamic characteristics to detect malicious code designed to evade virtualization systems. As an example, static characteristics may comprise at least one of the following: the malicious code's operational code (Op Code), and a sequence of binary information that constitutes structural information of the execution file (Session information containing headers and information, module connection information, and string information) and the actual execution commands via a binary image. Moreover, for effective detection, the virtual machine executor can transform this information into a set of values according to its own rules, including a sufficiently large set of execution commands (ranging from 512 bytes to 8092 bytes).

Additionally, the virtual machine executor can extract dynamic characteristics within the initial command execution segment of the malicious code to neutralize the malicious code's virtualization system avoid techniques. Preferably, this execution segment can be implemented to last about 30 seconds, although it may vary depending on the configuration environment. For instance, dynamic characteristics can be implemented as at least one of the following: data movement counting data within the predetermined execution time of the target code, access counting data in the network area, maximum allocated memory data in the memory area, and input and output counting data in the central processing area.

At step (S301), the virtual machine executor can extract memory I/O context. The memory I/O context may comprise aggregated memory information, private memory information, operating memory information, maximum memory usage, and information for the page allocation.

At step (S302), the virtual machine executor can extract the CPU context. The CPU context may comprise kernel mode operation data, I/O counting information, and generated tree data.

At step (S303), the virtual machine executor can extract the thread context. The thread context may include storage data, process runtime data, and data movement counting data.

At step (S304), the virtual machine executor can extract the disk/network context. For example, the disk context may comprise information on primary files and files within the virtual area. Additionally, the network context may comprise DGA-type URL and access counting data. The virtual machine executor supports the extraction of multiple dynamic characteristics from the executing target code, which can be input into multiple artificial intelligence models.

The virtual machine executor collects dynamic characteristics in predefined areas during the initial execution segment set for the target code and can terminate the process for the target code once collection is complete. The length of the initial execution segment can be set based on the terminal information according to the virtualization profile.

Figure 4:
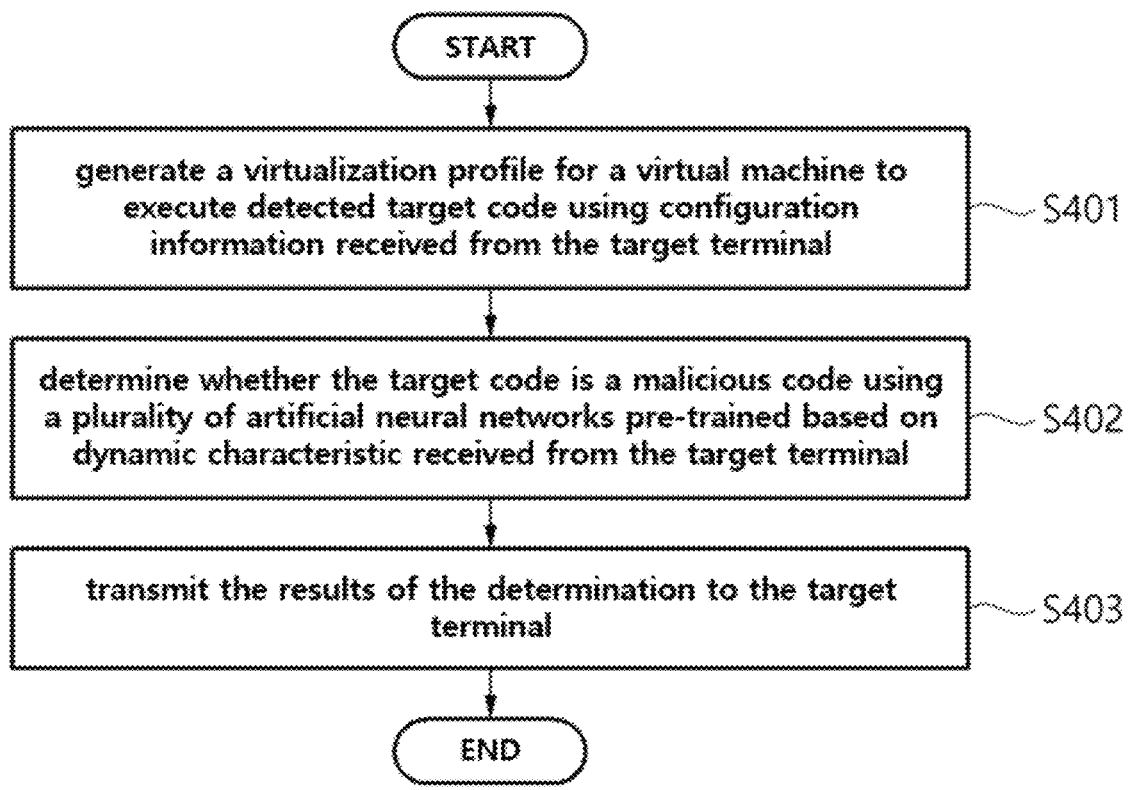
FIG. 4 is a flowchart describing the process of determining the presence of malicious code based on artificial intelligence by a server according to an embodiment.

FIG. 4 is a flowchart describing the process by which a server determines the presence of malicious code based on artificial intelligence. At step (S410), the server can generate a virtualization profile for a virtual machine to execute detected target code, using the configuration information received from the target terminal. Specifically, when a process suspected of being new malicious code or identified as existing malicious code is executed, the terminal can stop the process, collect the current configuration information of the terminal, and send this collected information to the server. The terminal can request an optimized virtualization profile from the server during this process.

At step (S401), the virtual information collector within the server can use the configuration information of the target terminal to send the most matching or similar virtualization profile among the multiple profiles it has, to the terminal. The terminal can then use this virtualization profile received through its virtual machine executor to operate the virtual machine. Moreover, the virtual machine executor of the terminal can extract static characteristics from the binary information of the target code. Additionally, it can extract dynamic characteristics within a predetermined execution segment where avoid commands against the virtualization system are expected. The virtual machine executor, in this embodiment, detects malicious code by utilizing static and dynamic characteristics corresponding to commands within the malicious code that recognize and attempt to evade the virtual system, thus providing an effective detection of virtualization-evasive malicious code.

At step (S402), the server can use multiple pre-trained artificial neural networks, based on the dynamic characteristics received from the target terminal, to determine whether the target code is malicious code. For instance, the server can input the multiple dynamic characteristics received into several pre-trained artificial neural networks sequentially, and make a determination based on the highest probability value obtained about the malice of the extracted code. In another embodiment, the server can input the received dynamic characteristics into several artificial neural networks sequentially and use the average of the probability values output by each neural network to make a determination about the target code. Although not shown in FIG. 4, the server's decision results could be used for reinforcement learning of the artificial intelligence model, and the updated AI model could be disseminated or shared through connected platforms in the cloud or stored within the terminal as needed.

In another embodiment, the terminal could also independently execute a determination of whether the target code is malicious code, based on the extracted dynamic characteristics using an artificial intelligence model stored within the terminal itself.

At step (S403), the server can transmit the results of the determination to the target terminal. Depending on the outcome of the judgment, if the process is deemed malicious code, the terminal can take measures such as forcibly terminating the process, isolating it, and storing the log of these actions in the log manager.

According to this embodiment, the use of malicious code detection technology is expected to enhance the effectiveness of a variety of virtualization system-based security products in preventing societal harm caused by variants of malicious code and ransomware. The market size is projected to grow continuously, potentially forming an important trend in the early global market.

The market for security products utilizing next-generation artificial intelligence, such as Endpoint Detection and Response (EDR), is steadily increasing, and the domestic endpoint platform market has grown to a scale exceeding 200 billion won. The global market for trusted information related to malicious code, known as Computer Telephony Integration (CTI), has surpassed 1.5 trillion won, and if integrated AI detection technology is applied to various developers and software, a niche market of 2 to 3 trillion won can be anticipated.

Particularly, based on the detection technology of this embodiment, it is possible to effectively block targeted malicious code attacks on public institutions, large corporations, supply chains, and social infrastructure, thereby reducing social costs and contributing to industrial and information security development.

The embodiments described above can be implemented as hardware components, software components, or a combination of both. For example, the devices, methods, and components described in the embodiments can be implemented using one or more general-purpose computers or special-purpose computers, such as processors, controllers, ALUs (arithmetic logic units), digital signal processors, microcomputers, FPGAs (field programmable gate arrays), PLUs (programmable logic units), microprocessors, or any other device capable of executing instructions and responding. The processing device can perform one or more software applications running on an operating system (OS) and can access, store, manipulate, process, and generate data in response to the execution of software. For simplicity, although only one processing device is described as being used in some instances, a person of ordinary skill in the art will recognize that the processing device may include multiple processing elements and/or multiple types of processing elements. For instance, the processing device could include multiple processors or one processor and one controller. Other processing configurations, such as parallel processors, are also possible.

Software may include computer programs, code, instructions, or a combination thereof, and can configure the processing device to operate as desired or command the processing device independently or collectively. Software and/or data may be embodied permanently or temporarily in any type of machine, component, physical device, virtual equipment, computer storage medium or device, or transmitted signal wave to provide instructions or data to the processing device. Software and data may be distributed and stored or executed in a distributed manner on a network-connected computer system. Software and data may be stored on one or more computer-readable recording media.

Methods according to the embodiments can be implemented in the form of program instructions that can be executed through various computer means and recorded on computer-readable media. Computer-readable media can include program instructions, data files, data structures, or a combination thereof. The program instructions recorded on the computer-readable media may be specially designed and configured for the embodiments, or they may be known to and available to computer software practitioners. Examples of computer-readable recording media include magnetic media such as hard disks, floppy disks, and magnetic tape; optical media such as CD-ROMs and DVDs; magneto-optical media such as floptical disks; and hardware devices specifically configured to store and execute program instructions, such as ROM, RAM, flash memory, etc. Examples of program instructions include machine code, such as that produced by a compiler, as well as high-level language code that can be executed by a computer using an interpreter, among others. The mentioned hardware devices may be configured to operate as one or more software modules to perform the operations of the embodiments, and vice versa.

As described, although the embodiments have been described with limited drawings, a person of ordinary skill in the art could apply various technical modifications and variations based on the above. For example, the techniques described may be performed in a different order than described, and/or the components of described systems, structures, devices, circuits, etc., may be combined or arranged differently or substituted or replaced by other components or equivalents without departing from the desired results.

What is claimed is:

1. A computing device for determining a malicious code based on artificial intelligence, comprising:
   at least one processor;
   a virtual information collector implemented by the at least one processor, configured to generate a virtualization profile for a virtual machine to execute a target code detected using a terminal configuration information received from a target terminal; and
   a determiner implemented by the at least one processor, configured to preprocess at least one dynamic characteristic related to an avoid command for a virtualization system contained within the target code transmitted from the virtual machine of the target terminal, select at least one artificial neural network from a plurality of pre-trained artificial neural networks pre-trained based on a characteristic value of the preprocessed at least one dynamic characteristic, and determine whether the target code is a malicious code using the selected artificial neural network,
   wherein the determiner determines candidates of the artificial neural network based on whether the characteristic value of the preprocessed dynamic characteristic is a continuous data, comprises a text data, or comprises a binary data, and selects the at least one artificial neural network based on a numerical range of the continuous data if the characteristic value is a continuous data.

2. The computing device of claim 1, further comprising:
   a log manager configured to store and manage a log data for termination and isolation of a process for the malicious code according to a determination result by the determiner,
   wherein the determiner preprocesses the at least one dynamic characteristic extracted from the virtual machine, by sampling at least one of a counting data for data movement in a section where the target code is executed for a predetermined time, an access counting data in a network area, a maximum allocated memory data in a memory area, and an input and output counting data in a central processing area.

3. The computing device of claim 2, wherein:
   the determiner determines the candidates of artificial neural network based on whether the characteristic value of the preprocessed dynamic characteristic match an input data used in a training process of the plurality of pre-trained artificial neural networks, and an output data of the plurality of pre-trained artificial neural networks represents a probability value as to whether the target code is a malicious code.

4. The computing device of claim 3, wherein:
   if the characteristic value of the preprocessed dynamic characteristic do not match the input data used in the training process of the plurality of pre-trained artificial neural networks, the determiner extracts an additional static characteristic of the target code and determines the candidates of artificial neural network based on the extracted additional static characteristic,
   wherein the extracted additional static characteristic includes at least one of an execution code of the target code, a structural information of an execution file, and a binary data composing the execution file.

5. The computing device of claim 3, wherein:
   if the characteristic value of the preprocessed dynamic characteristic is a discrete data, the determiner inputs the preprocessed dynamic characteristic into each of the determined candidates of artificial neural network and determines whether the target code is malicious code using a maximum value and an average value of the probability value output from each of the determined candidates of artificial neural network.

6. A terminal for determining a malicious code using an artificial neural network within a designated server, comprising:
   at least one processor;
   a configuration information collector implemented by the at least one processor, configured to collect a configuration information of the terminal, including a hardware information, an operating system information, and a software information of the terminal, to receive a virtualization profile from the designated server and send the configuration information to the designated server;

a detector implemented by the at least one processor, configured to, if an undefined process associated with an avoid command against a virtualization system is executed, stop the undefined process and send a target code associated with the undefined process to the designated server; and a virtual machine executor implemented by the at least one processor, configured to execute the undefined process for a predetermined period based on the virtualization profile sent by the designated server and send at least one of a static characteristic and dynamic characteristic extracted by the execution to the designated server.

7. The terminal of claim 6, wherein:
the virtual machine executor extracts at least one of a counting data for data movement in a section where the target code is executed for a predetermined time, an access counting data in a network area, a maximum allocated memory data in a memory area, and an input and output counting data in a central processing area as the dynamic characteristic.

8. The terminal of claim 6, wherein:
the virtual machine executor extracts at least one of an execution code of the target code, a structural information of an execution file, and a binary data composing the execution file as the static characteristic.

9. The terminal of claim 6, wherein:
the designated server comprises:
a virtual information collector configured to generate a virtualization profile for a virtual machine to execute a target code detected by using a terminal configuration information received from the terminal; and a determiner configured to preprocess at least one dynamic characteristic transmitted from the virtual machine executor of the terminal, select at least one artificial neural network from a plurality of pre-trained artificial neural networks pre-trained based on a characteristic value of the preprocessed dynamic characteristic, and determine whether the target code is a malicious code using the selected artificial neural network, wherein the determiner configured to determine candidates of artificial neural network based on whether the characteristic values of the preprocessed dynamic characteristic is a continuous data, comprises a text data, or comprises a binary data, and select at least one artificial neural network based on a numerical range of the continuous data if the characteristic value is a continuous data.

* * * * *